March 15, 1966  H. D. LEPORE ETAL  3,240,287
AUTOMATIC PARKING DEVICE
Filed July 19, 1963  3 Sheets-Sheet 1
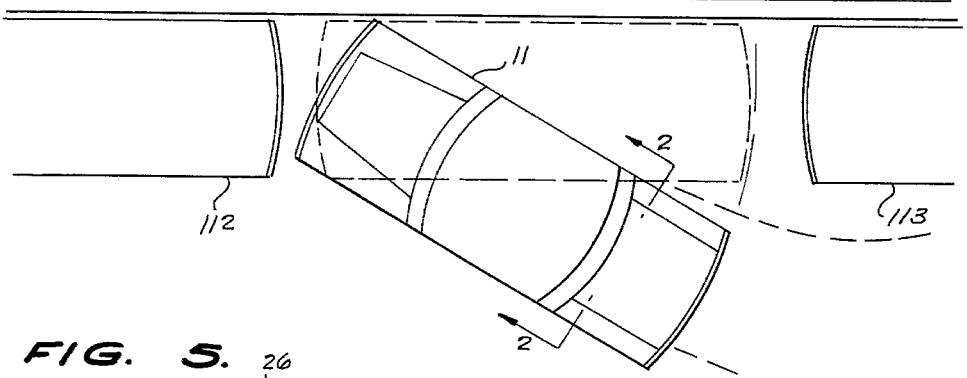
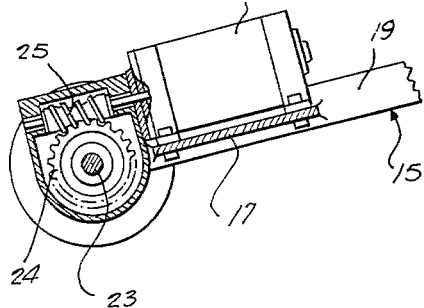
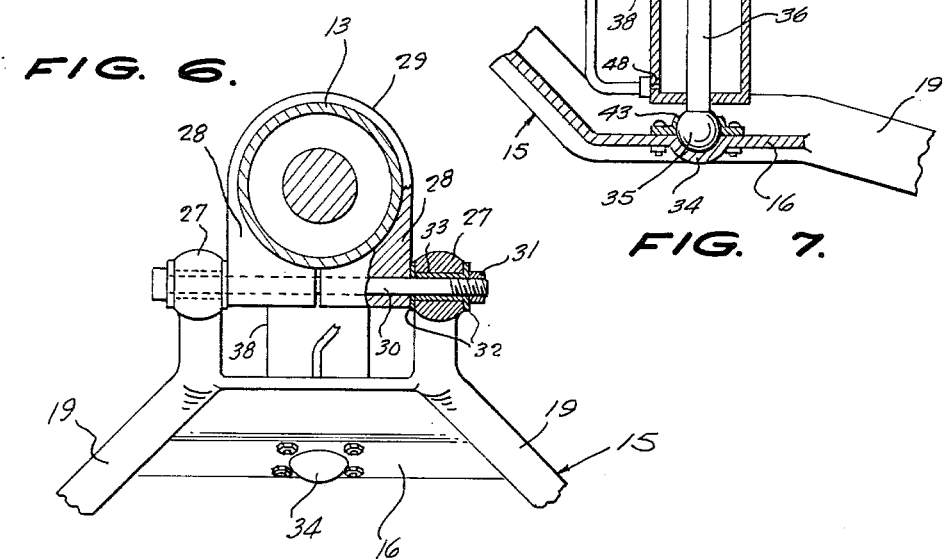
INVENTORS
HENRY D. LEPORE,
WILLIAM P. LEPORE,
BY
McMorrow, Berman + Davidson
ATTORNEYS.

March 15, 1966   H. D. LEPORE ETAL   3,240,287
AUTOMATIC PARKING DEVICE
Filed July 19, 1963   3 Sheets-Sheet 2

INVENTORS
HENRY D. LEPORE,
WILLIAM P. LEPORE,
BY
McMorrow, Berman + Davidson
ATTORNEYS.

March 15, 1966    H. D. LEPORE ETAL    3,240,287
AUTOMATIC PARKING DEVICE

Filed July 19, 1963      3 Sheets-Sheet 3

INVENTORS.
HENRY D. LEPORE,
WILLIAM P. LEPORE,
BY

McMorrow, Berman & Davidson
ATTORNEYS.

United States Patent Office 3,240,287
Patented Mar. 15, 1966

3,240,287
AUTOMATIC PARKING DEVICE
Henry D. Lepore, 26 South St., and William P. Lepore, 62 Greenwood St., both of Marlboro, Mass.
Filed July 19, 1963, Ser. No. 296,296
6 Claims. (Cl. 180—1)

This invention relates to vehicle parking devices, and more particularly to means for parking a motor vehicle in a confined space.

A main objective of the invention is to provide a novel and improved power-operated parking device for a motor vehicle which enables the motor vehicle to be parked in a relatively confined space which is too small for parking a vehicle by the ordinary methods, the parking device being relatively simple in construction, being easy to install on a vehicle, and being operable in a simple and convenient manner requiring substantially no manual exertion on the part of the vehicle operator.

A further objective of the invention is to provide an improved power-operated vehicle parking device which may be attached to the rear axel housing of a motor vehicle with a minimum amount of modification of a vehicle, the parking device involving relatively inexpensive components, being durable in construction, being easy to operate, and enabling the vehicle equipped therewith to be parked in a much shorter parking space than was heretofore possible without the device of the present invention.

A still further object of the invention is to provide a vehicle parking device adapted to be attached to the rear axel housings of a motor vehicle and which is retracted to an elevated position when not in use so that it does not interfere with the normal operation of the vehicle, the parking device being provided with means for elevating the rear portion of a vehicle when the vehicle is to be parked and for then moving said rear portion of the vehicle laterally into the parking space to complete the parking operation, whereby the vehicle may be parked in a much shorter space than was heretofore possible and with a much smaller amount of exertion on the part of the vehicle operator.

Further objects and advantages of the invention will become apparent from the following description and claims, and from the accompanying drawings, wherein:

FIGURE 1 is a top plan view showing the manner in which a motor vehicle equipped with a parking apparatus according to the present invention is moved into a restricted parking space;

FIGURE 5 is an enlarged cross sectional view taken substantially on the line 5—5 of FIGURE 3;

FIGURE 6 is an enlarged cross sectional view taken substantially on the line 6—6 of FIGURE 2; and FIGURE 7 is an enlarged cross sectional view taken substantially on the line 7—7 of FIGURE 3.

Figure 2:
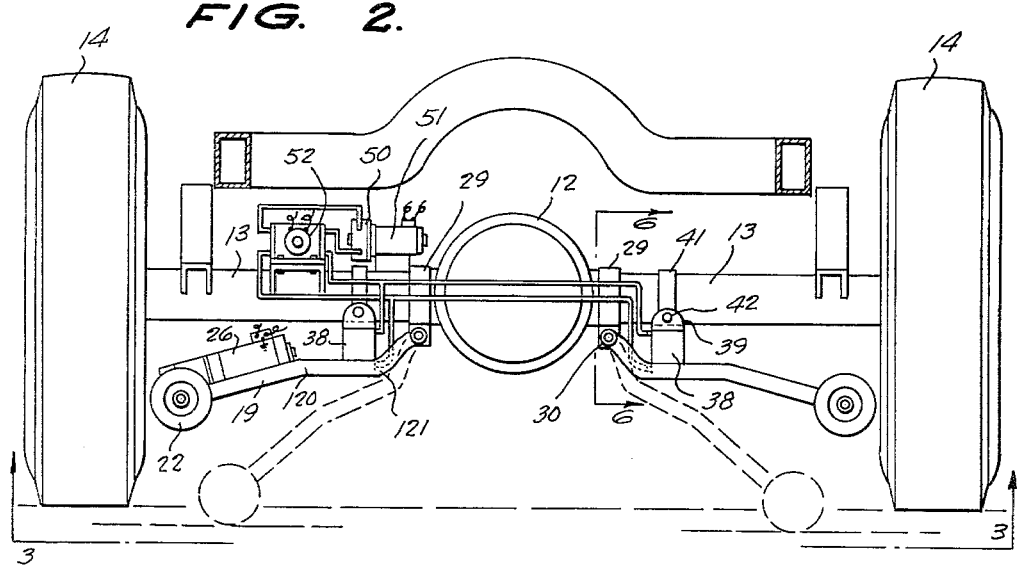
FIGURE 2 is an enlarged transverse vertical cross sectional view taken through the vehicle substantially on the line 2—2 of FIGURE 1.
Figure 3:
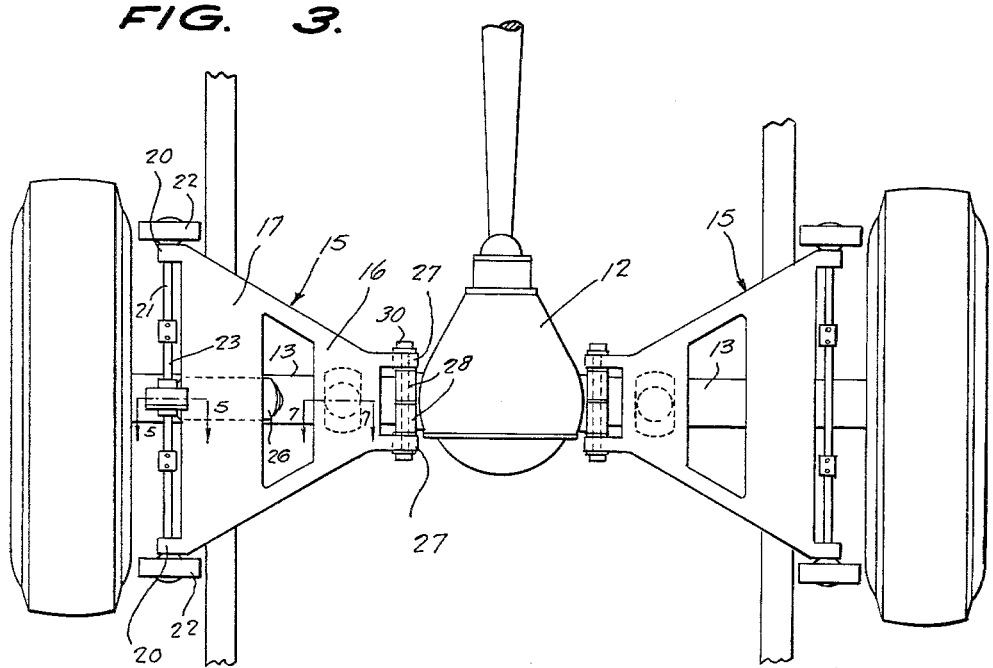
FIGURE 3 is a bottom plan view of the structure shown in FIGURE 2, taken substantially on the line 3—3 of FIGURE 2.

Referring to the drawings, 11 designates a conventional motor vehicle having the standard differential assembly 12 to the opposite sides of which are connected the respective rear axle housings 13, 13 containing the rear axles of a vehicle, said rear axles being connected to the rear wheels 14, 14.

In accordance with the present invention, respective elevating assemblies, designated generally at 15, 15 are secured to the rear axle housings 13, 13 adjacent to the main housing of the differential assembly 12, said elevating assemblies 15, 15 being identical in construction. Each assembly 15 comprises a generally triangular frame provided with a first web portion 16 at its inner end and with a second web portion 17 at its outer end, the respective outwardly diverging legs 19, 19 of the frame terminating in journal lugs 20, 20 in which is rotatably mounted a shaft 21 having ground engaging wheels 22, 22 rigidly secured to its outer ends.

The shaft 21 includes at its intermediate portion a worm shaft section 23 provided with a worm gear 24 which is meshingly engaged by a worm 25 mounted on the shaft of a reversible electric motor 26 which is secured on the web portion 17, as shown in FIGURE 5.

The side legs 19, 19 of each frame 15 terminate at the inner portion of the frame in a pair of journal lugs 27, 27 receiving therebetween the respective depending side legs 28, 28 of a split clamping collar 29 engaged around the associated rear axle housing 13, as shown in FIGURE 6. A hinge bolt 30 extends through the journal lugs 27, 27 and the intervening depending legs 28, 28, as shown in FIGURE 6, the hinge bolt being provided with a suitable retaining nut 31. Respective bearing washers 32 are provided on the opposite sides of the lugs 27, 27, and bearing sleeves 33 are provided within said lugs. Each frame 15 is thus hinged to the inner end portion of the associated rear axle housing 13 for rotation on a longitudinal axis defined by the associated hinge bolt 30.

From FIGURE 6 it will be seen that the split collar 29 has an inside surface which closely conforms to the outside contour of the associated rear axle housing 13 so that the collar closely fits on said housing, and the wheels 22, 22 are located in a balanced arrangement relative to the associated collar 29 so as to eliminate any tendency of the collar to rotate on the associated housing 13 under loading conditions.

Each inner web portion 16 is formed with a ball-receiving cup 34 receiving the ball element 35 formed on the end of a piston rod 36 of a piston 37 contained in a hydraulic cylinder 38 which is vertically secured in depending relationship to the upwardly adjacent rear axle housing 13, as shown in FIGURE 7. Thus, each cylinder 38 is provided with a pair of spaced upstanding lugs 39 between which are received the depending side legs 40 of a collar member 41 secured on the axle housing 13, the lugs 39 being pivotally connected to the side legs 40 by suitable pivot fasteners 42 such as bolts or rivets. A ball retaining collar 43 surrounds the upper portion of the ball member 35, said collar being secured to the web member 16, whereby to define a spherical socket for the ball 35, as is clearly shown in FIGURE 7.

The piston 37 is provided on its upper side with a stop abutment 44 engageable with the top wall of the cylinder 38 to limit the upward movement of the piston, and is similarly provided with a stop collar 45 on its lower side engageable with the bottom wall of the cylinder to limit the downward movement of the piston. The abutment elements 44 and 45 provide clearance space to insure communication of the upper and lower end portions of the piston with respective ports 47 and 48 provided at the upper and lower ends of the main cylinder wall.

Mounted on one of the rear axle housings 13 are a reversible pump 50 driven by a reversible electric motor 51 and a double solenoid-operated slide valve 52 provided with the respective operating solenoids 53 and 54 at its opposite ends. The pump 50 is of conventional construction and is provided with a sump chamber 53 sealingly connected to the pump, a first hydraulic line 55 being connected to the pump at the port thereof opposite the sump chamber 53, and a second hydraulic line 56 being connected to the sump chamber 53, as diagrammatically illustrated in FIGURE 4. A spring biased release valve 57 is connected across the hydraulic lines 55 and 56 automatically providing a by-pass connection across said lines when more than a predetermined safe pressure differential is developed therebetween.

Figure 4:
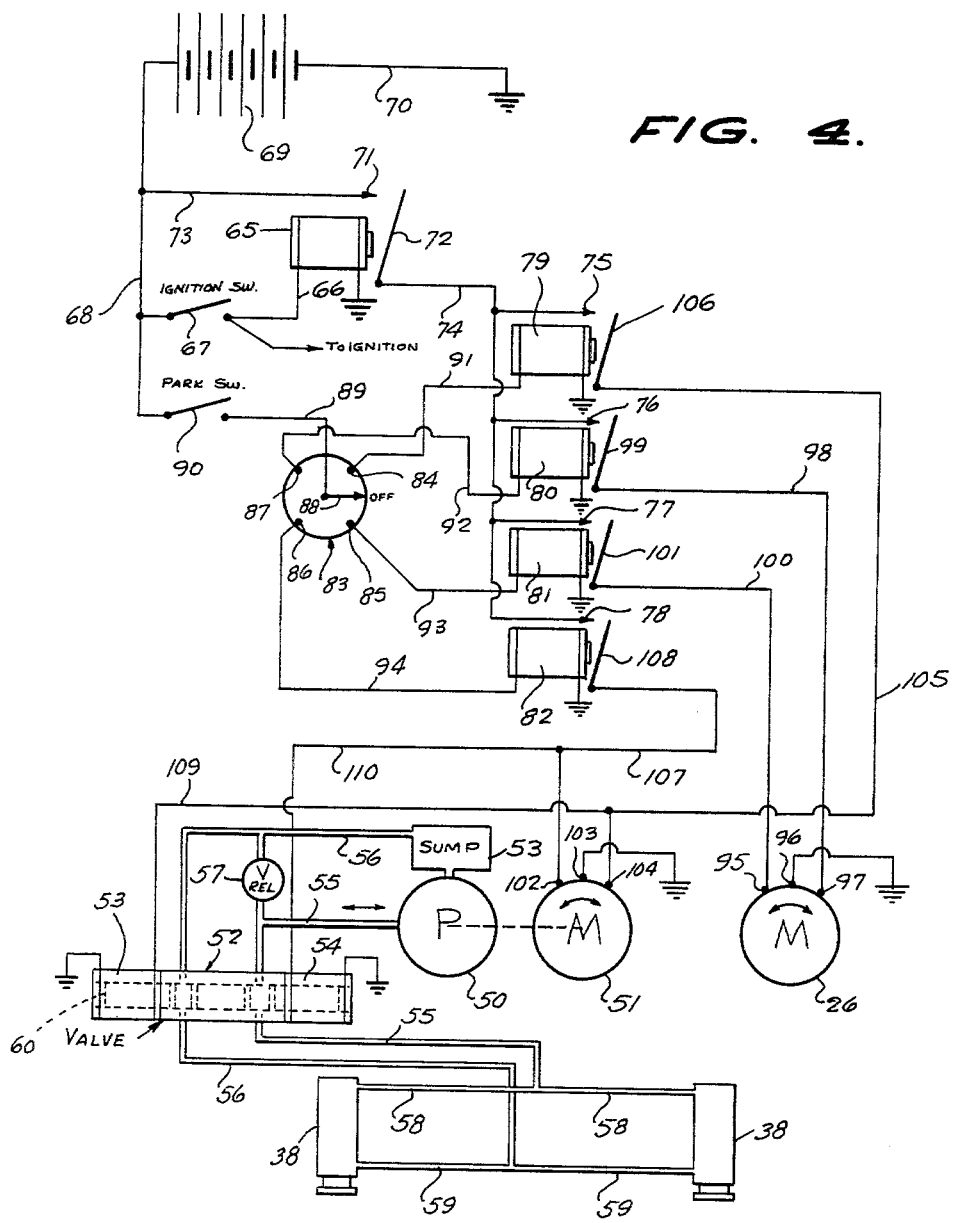
FIGURE 4 is a schematic diagram showing the electrical and hydraulic connections of the parking apparatus employed on the vehicle of FIGURES 1, 2 and 3.

As is diagrammatically shown in FIGURE 4, the hydraulic line 55 is connected through branch conduits 58, 58 to top end ports 47 of the respective hydraulic cylinders 38, and the hydraulic line 56 is connected by respective branch conduits 59, 59 to the lower end ports 58 of the cylinders 38.

The valve 52 is provided with an apertured slide block 60 arranged to open the hydraulic lines 56 and 55 responsive to the energization of either of the solenoids 53 or 54, said lines being closed when the solenoids are deenergized.

The electrical control circuit for the motors 26 and 51 and the solenoid valve 52 is diagrammatically illustrated in FIGURE 4. Thus, a main control relay 65 is provided, one terminal of the relay being grounded and the other terminal being connected by a wire 66 through the vehicle ignition switch 67 to the ungrounded battery terminal wire 68. The vehicle battery 69 has its other terminal connected to the vehicle frame, by a wire 70 in the conventional manner. The relay 65 has a stationary contact 71 and a movable pole 72 which engages the contact 71 responsive to the energization of the relay. The contact 71 is connected by a wire 73 to the ungrounded battery wire 68, and the pole 72 is connected by a wire 74 to the respective stationary contacts 75, 76, 77 and 78 of respective relays 79, 80, 81 and 82. The relays 65 and 79-82 are mounted in any convenient portion of the vehicle. A rotary selector switch 83 is mounted in a convenient location in the vehicle, for example, on the vehicle dashboard, the selector switch 83 having the respective stationary contacts 84, 85, 86 and 87 preferably arranged in the manner diagrammatically illustrated in FIGURE 4, the switch having the rotary pole 88 which may be rotated selectively to engage the stationary contacts 84–87.

The pole 88 is connected by a wire 89 through a "park" switch 90 mounted on the vehicle dashboard or in any other convenient location, such as on the steering column of the vehicle, to the ungrounded battery wire 68.

Each of the relays 79–82 has one of its terminals grounded. The remaining terminal of relay 79 is connected by a wire 91 to switch contact 84, the remaining terminal of the relay 80 is connected by a wire 92 to the switch contact 87, the remaining terminal of the relay 81 is connected by a wire 93 to the switch contact 85, and the remaining terminal of the relay 82 is connected by a wire 94 to the switch contact 86.

Motor 26 is a conventional direct current reversible motor having three terminals 95, 96 and 97, the common terminal 96 being grounded. The respective motor windings of the motor 26 are connected between the terminals 96, 97 and 96, 95. Terminal 97 is connected by a wire 98 to a movable pole 99 of relay 80. The opposite motor terminal 95 is connected by a wire 100 to the movable pole 101 of relay 81.

Motor 51 similarly has three terminals 102, 103 and 104, the terminal 103 being common to the two motor windings and being grounded, as shown. The respective motor windings are therefore connected between terminals 103, 104 and 103, 102. Motor terminal 104 is connected by a wire 105 to the movable pole 106 of relay 79. Motor terminal 102 is connected by a wire 107 to the movable pole 108 of relay 82.

Each of the valve-operating solenoids 53 and 54 has one terminal grounded, as shown. The remaining terminal of solenoid 53 is connected by a wire 109 to the wire 105, and the remaining terminal of the solenoid 54 is connected by a wire 110 to the wire 107.

It will be seen that the solenoids 53 and 54 are respectively connected in parallel with the respective motor windings of the pump motor 51, so that the slide bar 60 of the valve 52 is moved to opening position whenever the pump motor 51 is energized.

In operation of the apparatus, the motor vehicle 11 is first moved forwardly so that the forward end thereof is moved into the parking space between two vehicles 112 and 113, as shown in FIGURE 1. With the ignition switch 67 closed, the parking switch 90 is then closed. Pole 72 therefore engages contact 71 connecting the wire 74 to the ungrounded battery wire 68. The rotatable pole 88 of switch 83 is then moved into engagement with the contact 84, energizing the relay 79 through a circuit comprising battery wire 68, switch 90, pole 88, contact 84, wire 91, the winding of relay 79 and ground. This energizes the pump motor 51 by a circuit comprising battery wire 68, wire 73, contact 71, pole 72, wire 74, contact 75, pole 106, wire 105, terminal 104 of the motor 51, the motor winding, and to ground through the terminal 103. This drives the pump 50 in a direction to circulate hydraulic fluid in a forward direction through the hydraulic line 55, the solenoid 53 being energized, causing the valve 52 to open. The hydraulic fluid moves into the top portions of the respective hydraulic cylinders 34, moving the pistons 37 downwardly, and lowering the elevating frames 15, 15. The hydraulic fluid in the lower portions of the cylinders flows through the lines 59 and 56 into the sump 53 on the suction side of the pump 50, for this direction of rotation of the pump rotor.

The frames 15, 15 are thereby lowered to bring the wheels 22, 22 into ground engagement and to elevate the rear wheels 14, 14 from the ground. When the stop collars 45 below the pistons 37 engage the bottom walls of the cylinders 38, further movement of the pistons is prevented, and if there is an excessive build-up of pressure differential between the lines 55 and 56, the relief valve 57 opens, allowing the excess fluid to by-pass across the lines and return to the sump 53.

After the rear portion of the vehicle 11 has been elevated in the manner above described, the rotary switch pole 88 is moved into engagement with the contact 87 thus deenergizing the relay 79 and stopping the pump motor, as well as deenergizing the valve solenoid 53. Deenergization of solenoid 53 causes the valve to close, trapping the hydraulic fluid in the upper portions of the cylinders 38, 38, and holding the rear portion of the vehicle in its elevated position.

The energization of the relay 80 energizes the winding of motor 26 connected between terminals 96 and 97 by a circuit comprising battery wire 68, wire 73, relay pole 72, wire 74, relay contact 76, relay pole 99, wire 98, terminal 97 and the motor winding connected to ground through the terminal 96. The motor 26 thus drives the axle 23 through the worm 25 and worm gear 24, in turn driving the main shaft assembly 21 and the wheels 22, 22 in a direction to move the rear end of the vehicle 11 into the parking space between the spaced vehicles 112 and 113, namely, to move the vehicle 11 in a counterclockwise direction, as viewed in FIGURE 1.

After the rear end of a vehicle has moved into a position adjacent the curb, the switch pole 88 is rotated to engage contact 86, whereby motor 26 becomes deenergized and the pump motor 51 is energized, along with the solenoid 54 of valve 52. Thus, the closure of the contacts 88, 86 energizes relay 82 by a circuit comprising battery wire 68, switch 90, wire 89, pole 88, contact 86, wire 94, the winding of relay 82 and ground. The engagement of relay pole 108 with contact 78 energizes the winding of motor 51 between terminals 101, 103 by a circuit comprising battery wire 68, wire 73, contact 71, pole 72, wire 74, contact 78, pole 108, the winding of motor 51 between terminals 102 and 103, and thence to ground. Simultaneously, the solenoid 54 becomes energized since it is connected in parallel with said motor winding. The valve 52 opens, and the pump 50 is operated in a direction to withdraw hydraulic fluid from the upper portions of the cylinders 38, 38, and to force hydraulic fluid into the lower portions of said cylinders, thereby urging the pistons 37 upwardly and lowering the rear end portion of the motor vehicle because of the elevation of the frames 15, 15. The frames 15, 15 are elevated to their uppermost position, limited by the engagement of the abutment elements 44 with the top walls of the cylinders 38, any excessive build-up of hydraulic pressure differential between the lines 55 and 56 being relieved by the opening of the relief valve 57, as above described. Thereafter, the movable pole 88 of switch 83 can be moved to disengage from the contact 86, deenergizing the relay 82 and allowing pump motor 51 and solenoid 54 to become deenergized.

To move the vehicle out of the parking space, a reverse procedure is followed, beginning with the elevation of the rear end portion of the motor vehicle by causing pole 88 to engage contact 84. Thereafter, the pole 88 is brought into engagement with the contact 85, which energizes the relay 81. This energizes the winding of motor 26 between the terminals 95 and 16 thereof by a circuit comprising battery wire 68, wire 73, contact 71, pole 72, wire 74, contact 77, movable pole 101, wire 100, the motor winding between terminals 95 and 96, and thence to ground. This energizes the motor 26 in a direction to move the elevated rear end portion of the motor vehicle 11 in a clockwise direction, as viewed in FIGURE 1, namely, to move the rear end of the motor vehicle away from the curb, until it reaches a position such that it can be backed out of the parking space. When this angular position of the motor vehicle has been reached, the switch pole 88 is rotated into engagement with the contact 86, which energizes the relay 82 and causes pump 50 to become energized so as to drive fluid through the hydraulic circuit in a direction to lower the motor vehicle, as above described. At the end of the lowering operation, with the frames 15, 15 elevated to their uppermost positions, the switch pole 88 is moved out of contact with respect to the contact element 86, completing the operation.

After the completion of the above described operation, the motor vehicle may be backed out of the parking space in the usual manner.

It will be noted that in the elevated position of the generally A-shaped frames 15, 15, the cylinders 38 extend substantially perpendicular to the web portion 16, as shown in FIGURES 2 and 7. The frames 15 are preferably offset at these portions, namely, the portions containing the webs 16, by the provision of opposite obtuse angled bends 120, 121 at opposite sides of the cylinders. Each web 16 is therefore angled relative to the general plane of the associated frame 15 in a manner to keep the associated piston rod 36 always at an angle nearly perpendicular to the general plane of its frame 15 whereby to maintain an efficient downward thrust on the frame at all times during the lifting of the rear portion of the vehicle.

While a specific embodiment of an improved motor vehicle power-operated parking device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a motor vehicle of the type having transverse oppositely extending rear axle housings and a differential assembly therebetween, a parking apparatus comprising respective frame members hinged to the housings adjacent said differential assembly and extending beneath the housings, said frame members flaring outwardly in width, a pair of ground-engaging wheels journalled on the outer ends of the free end portion of each frame member, each frame member having an intermediate bearing portion, a hydraulic jack cylinder operatively connected between said bearing portion and the upwardly adjacent axle housing, reversible electric pump means operatively connected to the jack cylinders for raising and lowering said frame members, whereby to lower and raise the vehicle rear end portion, reversible motor means drivingly connected to at least one pair of ground-engaging wheels, a source of current, multiple-position selector switch means having at least four distinct positions of closure, circuit means connecting said source to said reversible pump means through said switch means, means reversible energizing said pump means when the switch means is either in a first or a second one of said positions of closure, circuit means connecting said source to said reversible motor means through said switch means, means reversibly energizing said motor means when the switch means is in either the third or the fourth position of closure thereof, normally closed valve means connected between the pump means and the jack cylinders, and means to open said valve means simultaneously with the energization of said pump means.

2. In a motor vehicle of the type having transverse oppositely extending rear axle housings and a differential assembly therebetween, a parking apparatus comprising respective frame members hinged to the housings adjacent said differential assembly and extending beneath the housings, said frame members flaring outwardly in width, a pair of ground-engaging wheels journalled on the outer ends of the free end portion of each frame member, respective hydraulic jack cylinders operatively connected between the frame members and the upwardly adjacent axle housings for lowering and raising said frame members, and for correspondingly raising and lowering the rear end portion of the vehicle, reversible electric pump means operativelvy connected to the jack cylinders, reversible electric motor means drivingly connected to at least one pair of ground-engaging wheels, a source of current, multiple-position selector switch means having at least four distinct positions of closure, circuit means connecting said source to said reversible pump means through said switch means, means reversibly energizing said pump means when the switch means is in either a first or a second one of said positions of closure, circuit means connecting said source to said reversible motor means through said switch means, means reversibly energizing said motor means when the switch means is in either the third or the fourth position of closure thereof, normally closed valve means connected betwen the pump means and the jack cylinders, and means to open said valve means simultaneously with the energization of said pump means.

3. In a motor vehicle of the type having transverse oppositely extending rear axle housings and a differential assembly therebetween, a parking apparatus comprising respective frame members hinged to the housings adjacent said differential assembly and extending beneath the housings, said frame members flaring outwardly in width, a pair of ground-engaging wheels journalled on the outer ends of the free end portion of each frame member, respective hydraulic jack cylinders operatively connected between the frame members and the upwardly adjacent axle housings for lowering and raising said frame members, and for correspondingly raising and lowering the rear portion of the vehicle, reversible electric pump means operatively connected to the jack cylinders, a source of current, said jack cylinders being extended or contracted in accordance with the direction of operation of the electric pump means, switch means having four positions of closure, circuit means connecting said source to said electric pump means through said switch means, means to selectively reversibly energize said pump means when the switch means is in either a first or a second position of closure, reversible electric motor means drivingly connected to at least one pair of ground-engaging wheels, circuit means connecting said source to said reversible motor means through said switch means, means to selectively reversibly energize said motor means when the switch means is in either the third or the fourth position of closure thereof, normally closed valve means connected between the pump means and the jack cylinders, and means to open said valve means simultaneously with the energization of said pump means.

4. In a motor vehicle of the type having transverse oppositely extending rear axle housings and a differential assembly therebetween, a parking apparatus comprising respective frame members hinged to the housings adjacent said differential assembly and extending beneath the housings, said frame members flaring outwardly in width, a pair of ground-engaging wheels journalled on the outer ends of the free end portion of each frame member, respective hydraulic jack cylinders operatively connected between the frame members and the upwardly adjacent axle housings for lowering and raising said frame members, and for correspondingly raising and lowering the rear portion of the vehicle, reversible electric pump means operatively connected to the jack cylinders, a source of current, said jack cylinders being extended or contracted in accordance with the direction of operation of the electric pump means, means to reversibly energize said pump means from said source of current, reversible electric motor means drivingly connected to at least one pair of ground-engaging wheels, means to reversibly energize said electric motor means from said source, normally closed valve means connected between said pump means and said jack cylinders, and means to open said valve means simultaneously with the energization of said pump means.

5. In a motor vehicle of the type having transverse oppositely extending rear axle housings and a differential assembly therebetween, a parking apparatus comprising collar members secured around the housings adjacent the differential assembly, respective generally triangular frame members extending beneath the axle housings, means hingedly connecting the apex portions of the frame members to the collar members for rotation around axes extending substantially longitudinally of the vehicle, respective pairs of ground-engaging wheels journalled to the outer corner portions of the frame members on substantially longitudinal axes, the wheels of each pair being located on opposite sides of the associated axle housing, respective hydraulic jack cylinders operatively connected between the frame members and the upwardly adjacent axle housings for lowering and raising said frame members, and for correspondingly raising and lowering the rear portion of the vehicle, reversible electric pump means operatively connected to the jack cylinders, reversible electric motor means drivingly connected to at least one pair of ground-engaging wheels, a source of current, multiple-position selector switch means having at least four distinct positions of closure, circuit means connecting said source to said reversible pump means through said switch means, means reversibly energizing said pump means when the switch means is in either the first or a second one of said positions of closure, circuit means connecting said source to said reversible motor means through said switch means, means reversibly energizing said motor means when the switch means is in either the third or the fourth posititon of closure thereof, normally closed valve means connected between the pump means and the jack cylinders, and means to open said valve means simultaneously with the energization of said pump means.

6. In a motor vehicle of the type having transverse oppositely extending rear axle housings and a differential assembly therebetween, a parking apparatus comprising collar members secured around the housings adjacent the differential assembly, respective generally triangular frame members extending beneath the axle housings, means hingedly connecting the apex portions of the frame members to the collar members for rotation around axes extending substantially longitudinally of the vehicle, respective pairs of ground-engaging wheels journalled to the outer corner portions of the frame members on substantially longitudinal axes, the wheels of each pair being located on opposite sides of the associated axle housing, respective hydraulic jack cylinders operatively connected between the frame members and the upwardly adjacent axle housings for lowering and raising said frame members, and for correspondingly raising and lowering the rear portion of the vehicle, reversible electric pump means operatively connected to the jack cylinders, reversible electric motor means drivingly connected to at least one pair of ground-engaging wheels, means to selectively energize said pump means and motor means, normally closed valve means connected between said pump means and said jack cylinders, and means to open said valve means simultaneously with the energization of said pump means.

References Cited by the Examiner

UNITED STATES PATENTS

| 1,890,716 | 12/1932 | Andreasen et al. | 180—1 |
| 1,976,308 | 10/1934 | Thomas | 180—1 |
| 2,416,838 | 3/1947 | Miller | 180—1 |
| 2,746,554 | 5/1956 | Matthews | 180—1 |

FOREIGN PATENTS

| 1,283,968 | 1/1962 | France. |
| 563,083 | 5/1957 | Italy. |

A. HARRY LEVY, *Primary Examiner.*